United States Patent Office 3,004,367
Patented Oct. 17, 1961

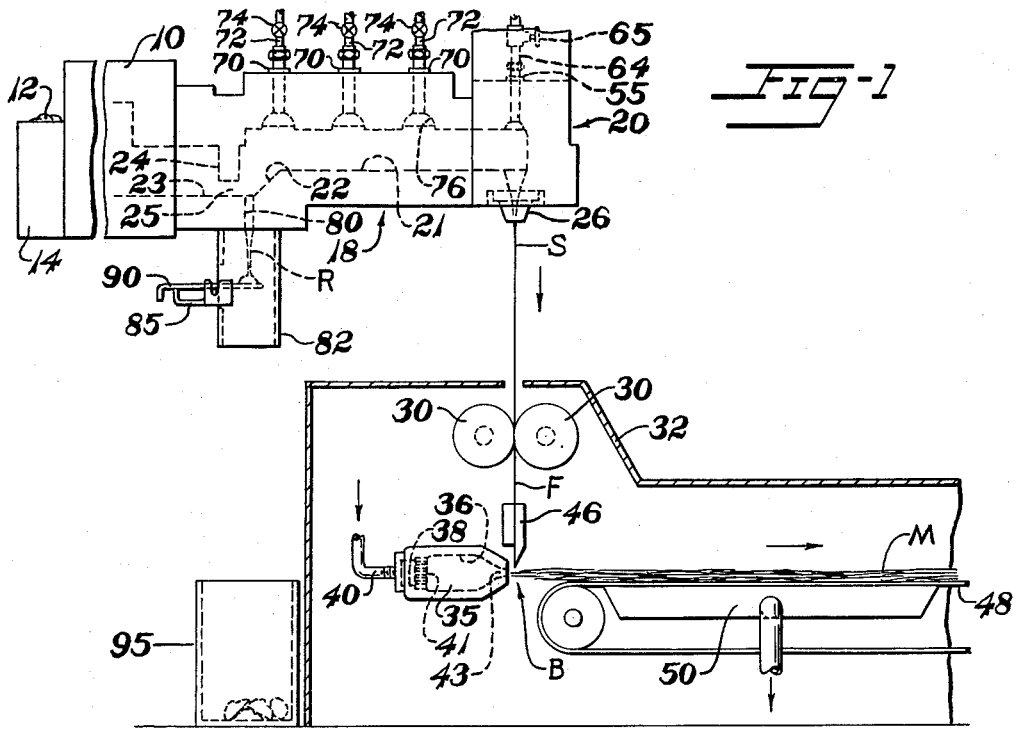
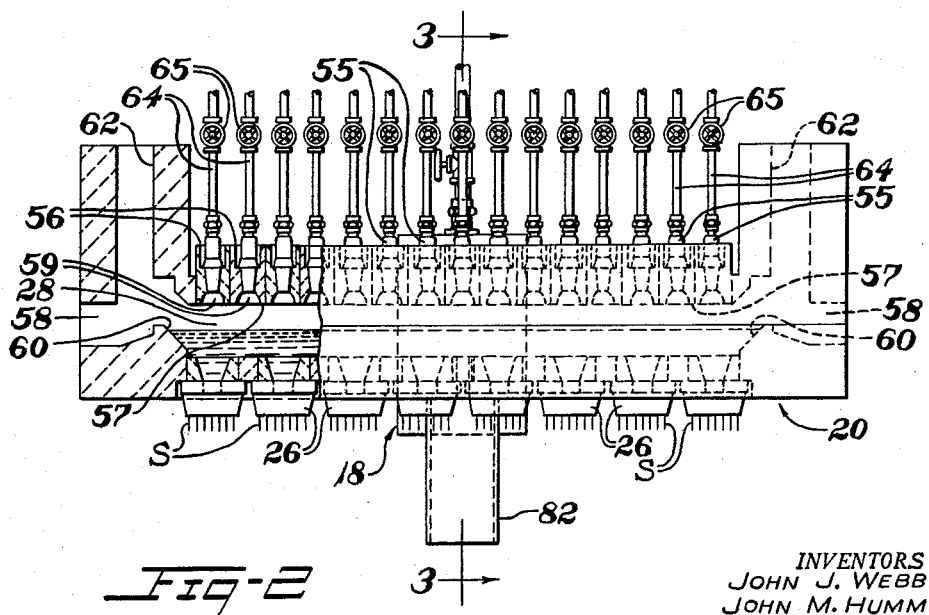

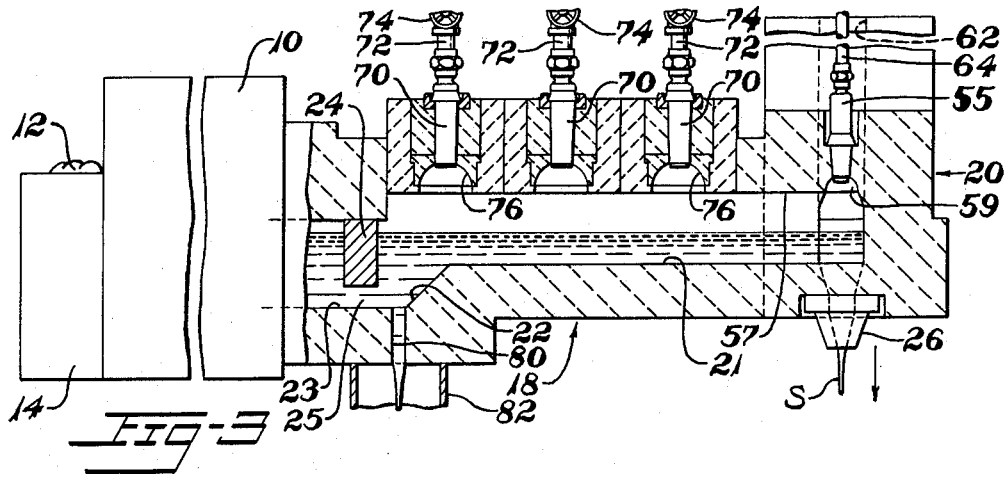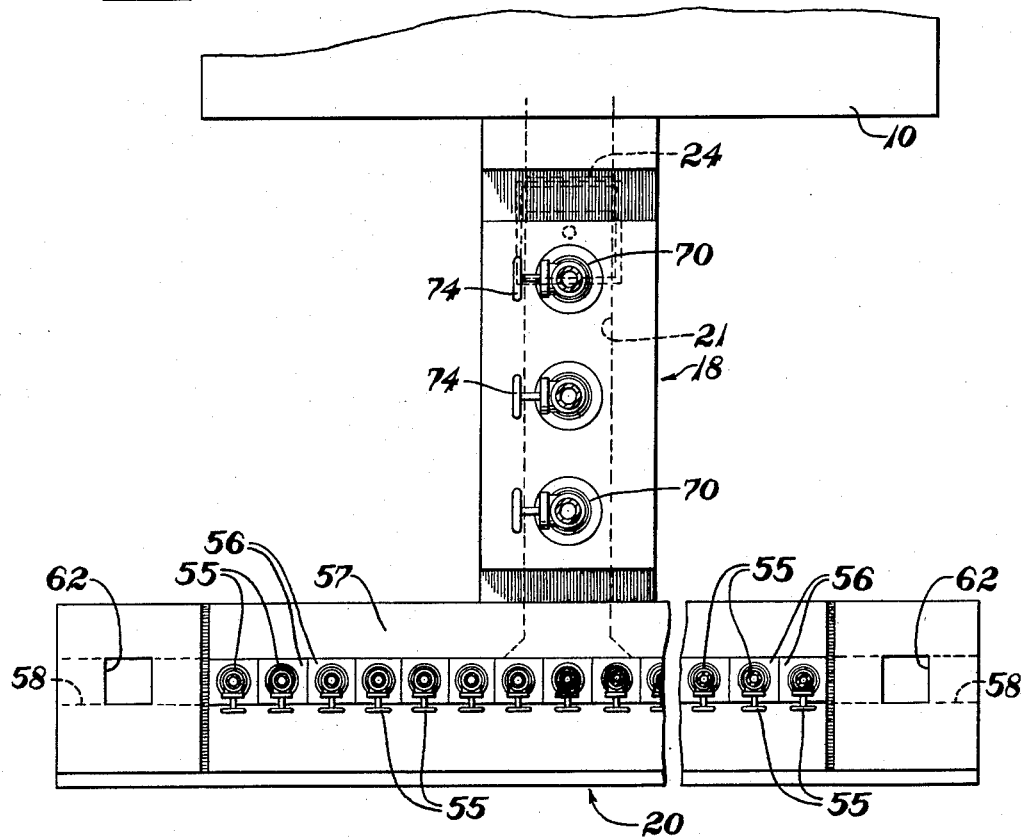

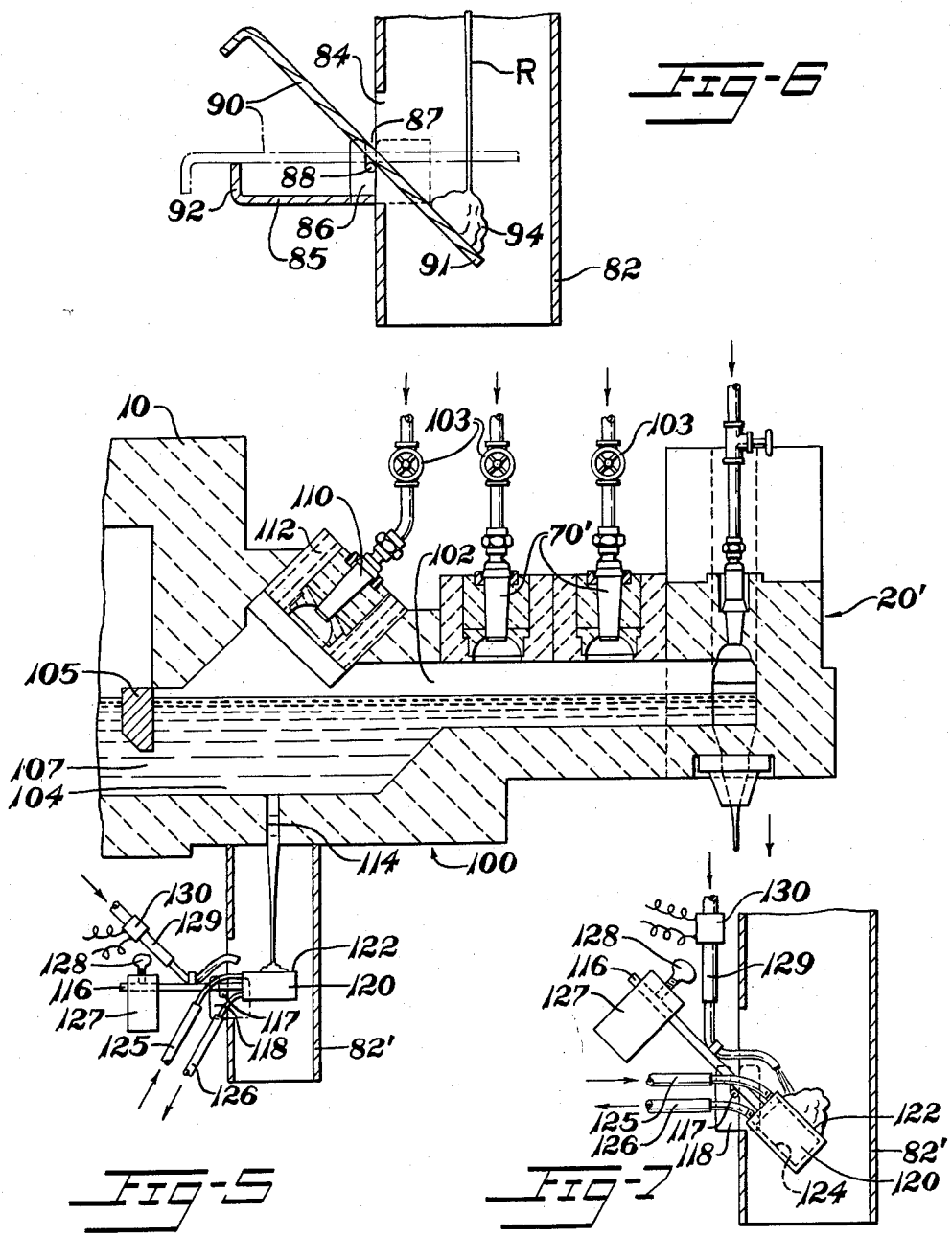

3,004,367
APPARATUS FOR PROCESSING HEAT-
SOFTENABLE MATERIALS
John J. Webber, Newark, Ohio, and John M. Hummel,
Mission, Kans., assignors to Owens-Corning Fiberglas
Corporation, Toledo, Ohio, a corporation of Delaware
Filed Aug. 3, 1953, Ser. No. 371,956
2 Claims. (Cl. 49—54)

This invention relates to apparatus for processing heat-softenable materials and more especially to fining and conditioning heat-softenable material such as glass or other mineral material to render the material homogeneous and flowable for utilization in forming or producing fibers by a suitable fiber attenuating means. It has been a practice to melt glass batch or cullet in a furnace and flow the molten material into a forehearth in order to supply glass in flowable condition to one or more feeders associated with the forehearth. The feeders are formed with a plurality of small openings or orifices through which streams of glass flow from the forehearth, providing glass bodies which may be readily attenuated into fibers. The streams or glass bodies may be attenuated to fibers by various means such as by engaging hot gaseous blasts moving at high velocities with primary filaments formed from the streams or engaging the streams directly with blasts of steam or compressed air. If continuous filaments or fibers are desired, the streams may be attenuated by directing the filaments into contact with rapidly rotating pull or nip rolls or the filaments or strand of filaments may be rapidly wound upon a cylindrical sleeve or mandrel into package form, the winding of the strand at high speed providing the force for attenuating or drawing the streams into filaments.

The uniformity and quality of fibers or filaments attenuated from the glass streams or primary filaments formed therefrom are, in a large measure, dependent upon the homogeneous character of the glass composition wherein the constituents are uniformly distributed and upon the proper control of temperature and viscosity characteristics of the glass adjacent each feeder associated with the forehearth. Arrangements of furnace and forehearth heretofore employed have certain disadvantages which have presented difficulties in maintaining satisfactory control of the homogeneity of the glass composition, viscosity and temperature characteristics in the production of filaments or fibers from several feeders disposed along the forehearth. In the event that a feeder connected to a conventional forehearth becomes defective or fails to function, it becomes necessary to interrupt the operation of the entire furnace and forehearth in order to repair or replace the feeder. Another inherent disadvantage of the conventional forehearth and feeder arrangement is that the feeder nearest the furnace receives glass at a higher temperature than those feeders positioned at greater distances from the furnace. Where continuous filaments formed from the glass streams are used for textile purposes, it is imperative that the filaments be of substantially uniform size from all of the feeders along the forehearth. If the characteristics of the glass adjacent the several feeders are not maintained at definite uniform standards, the textiles produced from the filaments or fibers will be nonuniform in texture, of poor quality and of varying strength characteristics.

An object of the present invention is the provision of an apparatus for fining and conditioning heat-softenable materials and more especially mineral materials for processing so as to maintain adequate and accurate control of the viscosity and temperature characteristics of the material during processing operations.

The invention embraces the provision of an apparatus for fining and conditioning heat-softened material such as glass in a manner whereby a number of stream feeders may be supplied with glass from a single furnace wherein the viscosity and temperature characteristics of the material may be accurately controlled and maintained uniform adjacent each feeder.

Another object of the invention resides in a combination of furnace and novel forehearth construction of T-shaped formation wherein the major portion of the forehearth extends transversely of the furnace and is connected to the furnace by a suitable channel disposed so as to facilitate improved fining of the glass and distribution in the various zones of the forehearth.

Another object of the invention resides in a combined melting furnace and T-shaped forehearth construction wherein the batch or cullet melted in the furnace is fined by generally straight-line flow through the furnace and through a single fining channel to the transverse forehearth section whereby an intimate mixing of the constituents of the glass composition is had, resulting in an improved quality of glass delivered into the forehearth.

Still another object of the invention is the provision of a furnace and forehearth construction of a character rendering it possible to repair a portion or portions of the forehearth or a feeder without shutting down or disrupting the operation of the furnace whereby processing of the glass or other material may be carried on through the remaining operating portions of the forehearth.

A further object is the provision of a forehearth construction embodying heating units disposed in positions to provide for substantially uniform or controlled heating throughout the zones of the forehearth so that products formed from the glass taken from the several feeders along the forehearth are of uniform character and quality.

Another feature of the apparatus resides in the provision of a simple yet effective means for disposing of dross or waste glass drawn from the melting furnace in a manner whereby the dross or waste is caused to form gobs or unit bodies so that waste glass or dross drained from the furnace or fining channel during the melting and fining operations may be readily removed from the zone of operations.

Still another object of the invention is the provision of a forehearth section connected with a melting furnace by a single fining channel or passage wherein all of the heat-softened material delivered to the forehearth passes through the channel whereby the fining of the glass and the uniformity or homogeneity of the mixture is improved over prior methods.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic view illustrating a form of apparatus of the invention in combination with one form of fiber attenuating means;

FIGURE 2 is a front elevational view of the forehearth construction of the invention;

FIGURE 3 is a transverse sectional view taken substantially on the line 3—3 of FIGURE 2;

FIGURE 4 is a top plan view of the forehearth construction shown in FIGURES 1 through 3;

FIGURE 5 is a view similar to FIGURE 3 showing a modification of the invention;

FIGURE 6 is a vertical sectional view illustrating an arrangement for disposing of waste material drained from the forehearth construction, and FIGURE 7 is a modified form of arrangement for disposing of material drained from the forehearth construction.

As the method and apparatus of the invention have particular utility with a furnace or equipment utilized for melting glass or other heat-softenable mineral material to utilize the glass or similar material for forming fibers or filaments, a melting furnace of this character is illustrated in conjunction with the apparatus. Referring to the drawings in detail and initially to FIGURES 1 through 4, there is illustrated a melting furnace or tank 10 constructed of refractory material which is adapted to receive glass batch or cullet 12 through a material receiving section 14. The furnace 10 is fired by fuel gas or oil in a conventional manner well known in the glass art to a temperature rendering the glass batch or cullet molten and flowable. As indicated in FIGURE 1, the raw batch material or cullet is introduced at the rear end of an elongated furnace 10, the material in molten condition flowing forwardly or generally lengthwise of the furnace, and is mixed and fined as it flows through the furnace.

Heretofore it has been a practice to construct a forehearth extending parallel with the longitudinal axis of the furnace, the glass flowing into such forehearth and from there through orifices in feeders in individual streams for further processing. The forehearth construction of the present invention is of T-shaped configuration or shape having a connecting neck or section 18 joined to the furnace 10 at one end and at the other end joined to a section 20 extending transversely of the connecting section 18 and longitudinal axis of the furnace.

The connecting section 18 is constructed of blocks of refractory material and is provided with a glass conveying and fining channel 21 which, at its entrance zone adjacent the connection with the furnace 10, is formed of an inclined wall 22 joined with a substantially horizontal bottom surface 23 aligned with the floor of the furnace 10. A skimmer block 24 is disposed in the channel of the connecting neck or section 18 adjacent its juncture with the melting furnace 10.

Disposed lengthwise of the main or transversely extending section 20 of the forehearth construction is a plurality of feeders or bushings 26 which are in direct communication with the glass receiving channel 28 formed in the forehearth section 20 and which is connected, preferably at its central zone, with channel 21 in the connecting section 18.

While the glass or other molten material in the forehearth section 20 may be delivered from the forehearth in any desired manner, depending upon the method of processing, the forehearth construction illustrated in the drawings is provided with a plurality of feeders, each provided with a plurality of openings or orifices for flowing glass streams adapted to form primary filaments or bodies which are adapted to be delivered or fed into an intensely hot, high velocity gaseous blast for attenuation to fine fibers. The feeders 26, shown in FIGURES 1, 2 and 3, are provided with a plurality of orifices through which flow streams S of glass or other heat-softenable, fiber-forming material contained in the melting furnace 10 and forehearth. The streams S are drawn into continuous primary filaments by means of a pair of pull rolls 30 rotating at comparatively slow speeds. The pull rolls 30 and the fiber attenuating means are illustrated as contained within an enclosure 32. The form of fiber attenuating or forming means illustarted in FIGURE 1 is inclusive of a series of burners 35 of the internal-combustion type, one burner being provided for each group of primary filaments formed from the streams flowing from each of the feeders 26. The burners 35 may be of the type shown in Stalego Patent No. 2,489,243, each having a combustion chamber 36 and a manifold 38 in communication with a pipe 40 which supplies a combustible mixture of fuel and oxidant to the combustion chamber. A wall 41 within each burner, perforated with a plurality of small openings or passages, separates the chamber 36 from the manifold 38, the perforated wall 41 forming a fire screen to avoid ignition in the manifold 38. The fuel mixture is burned substantially completely within the burner chamber 36, and the intensely hot gases of combustion are discharged through a restricted orifice 43 in the form of an intensely hot, high velocity blast B. The streams S, being drawn from the feeders 26 under the influence of the pull rolls 30, are substantially solidified into primary filaments F which are conveyed or delivered through a guide means 46 into the intensely hot zone of the gaseous blast adjacent the burner orifice 43. The heat of the burned gases softens the advancing extremities of the filaments F, and the high velocity of the gases in the blast attenuates or draws the softened material into fine fibers which are collected or accumulate upon the upper flight of an endless conveyor belt or means 48. The fibers thus collected in the form of a mass M may be further processed to finished fibrous products of various kinds. A suction chamber 50 adjacent the conveyor means is connected with a source of reduced pressure which assists in collecting the fibers upon the conveyor and carries away the spent gases of the blasts. It is to be understood that other types of attenuating means may be employed such as directing blasts of steam or compressed air against the molten streams S for drawing the streams directly to staple fibers or continuous filaments drawn from the streams may be rapidly wound in package form as disclosed in Slayter and Thomas Patent 2,133,238, the staple fibers and continuous filaments being particularly usable in the textile field.

The forehearth construction comprising sections 18 and 20 is formed of suitable high temperature refractory material. The transversely extending section 20 of the forehearth is provided with a plurality of heating means in the form of radiant heaters or burners 55 which are mounted lengthwise of section 20 in the upper wall or ceiling 57 above the glass receiving channel 28, each of the burners being supported in blocks 56 of refractory material. The heating units 55 are of the so-called radiant type and are adapted to burn a mixture of gaseous fuel and air, the combustion taking place in semispherically shaped recesses 59 formed in the wall 57 adjacent the nozzle portions of the burners 55 and also taking place in the space between the surface of the molten glass in the channel 28 and the wall 57. It should be noted that the burners 55 are relatively closely spaced and disposed directly above the feeders 26 and serve to regulate and control the temperature of the glass in the forehearth section 20 so that the viscosity of glass in all zones of the channel 28 and the feeders 26 is maintained constant.

Each of the burners is provided with an individual mixture supply pipe 64, each pipe being equipped with an independently operable obturator or valve 65 for regulating the mixture supplied to the individual burners, thereby enabling accurate and precision temperature control of the various zones in the forehearth section 20. By this means temperature regulation may be had over the entire length of the glass channel 28 in the forehearth section 20, providing accurate control over the viscosity of the glass or other material contained in the forehearth section 20. The end zones of the forehearth section 20 are provided with outlets 58, each formed with a dam or overflow wall 60 for maintaining a proper and constant depth of glass in the channel 28. The end zones of the section 20 are provided with vents or stacks 62 to provide for the escape of burned gases of combustion from the burners above the channel 28.

The section 18 joining the section 20 with the melting furnace 10 is provided with heating means in the form of a plurality of burners 70 disposed in the upper wall or roof portion of the glass conveying and fining channel 21 of the forehearth section. The burners 70 are of the same general character as burners 55 but may be made of a different size, depending upon the temperature desired in the channel 21. Each burner 70 is supplied with a combustible mixture of fuel gas and oxidant such as air through a duct or pipe 72, each pipe being provided with a valve or obturator 74 for controlling the mixture supply to the burner connected therewith. The combustion of the mixture takes place in the semispherically shaped chambers 76 formed adjacent the extremities of the burners and in the zone of the channel 21 above the glass or other material contained in the channel.

The connecting section 18 of the forehearth serves several functions. It provides, through the medium of channel 21 and entrance passage 25 beneath the skimmer block 24, a path or zone in which the molten glass from the melting furnace is fined before it is conveyed to the feeders or other zone of discharge from the forehearth. It is preferably of rectilinear shape, providing a rectilinear channel 21 through which all of the glass must flow before it is dispensed from the forehearth section 20. This feature provides for thorough mixing and fining of the glass constituents and improves the homogeneous character of the glass so that an improved quality of fibers is obtained.

The temperature of the glass in the melting furnace is usually much higher than the temperature of the glass in the zones of the feeders in the forehearth section to foster thorough melting and mixing of the constituents of the composition. Another of the functions of the connecting section 18 is to reduce slightly the temperature of the glass during its traverse through channel 21, a result which is accomplished by regulation of the burners 70. It is to be understood that if glass at a very high temperature is desired in the forehearth section, the burners 70 may be regulated to increase the temperature of the glass flowing through channel 21 into the central zone of the forehearth section 20. While the section 18 is preferably joined to the forehearth section 20 at a central zone of the latter, it is to be understood that the section 18 may be joined to the section 20 at a zone spaced from the center of section 20 and secure satisfactory distribution of the glass in forehearth section 20 as the burners 55 may be regulated individually to maintain the glass at the proper temperature throughout the length of the forehearth.

The forehearth construction embodying the individually controlled radiant burners makes possible the removal of a feeder and its replacement or repair in one of the arms of the forehearth section 20 without interrupting the operation of the feeders in the other arm and without impairing the continued operation of the melting furnace. By manipulation of the control valves of the burners, the burners adjacent a feeder needing repair or replacement may be regulated to decrease the heating of the local zone of such feeder sufficiently to cause temporary congealing of the glass at said zone until repair or replacement of the feeder is carried out. The temperature of the glass may thus be maintained in the zone of the defective feeder just under the flowing temperature so that the congealed glass may be quickly restored to a flowable state by merely regulating the heat of the adjacent burners after repair or replacement is made. In this manner only a portion of the feeders is temporarily rendered ineffective while the operation of the melting furnace is unimpaired. Should one of the feeders adjacent the junction of the channel 21 with channel 28 in the forehearth section 20 need repair or replacement, the burners in the connecting section 18 may be regulated to cause temporary congealing of the glass near the exit of channel 21 until proper repair or replacement has been made. In this instance the flow of glass to the other feeders in the forehearth will be temporarily interrupted, but the burners may be regulated to maintain the glass just under the flowing temperature so that full operation may be quickly restored. The arrangement avoids the previous difficulties with the conventional forehearth and melting furnace of permitting the glass to become cooled in order to make repairs or replacements.

It should be noted that the skimmer block 24 depends a distance sufficient to provide a restricted passage 25 from the melting furnace 10 into the channel 21 in the connecting section 18. The passage 25 directs the glass flow in a zone adjacent the bottom wall 23. As the bottom wall of the glass channel is of lesser temperature than the glass stream, the dross or impurities in the glass tend to remain in the coolest zone, viz, adjacent the bottom wall 23. In order to dispose of the dross and waste, an opening 80 is provided in the bottom wall through which the waste material may be discharged. It has been a practice to provide a drain opening in a furnace construction to facilitate discharge of the waste dross and the waste material is permitted to pile up in pyramidal shape, the material solidifying and forming a comparatively large and heavy body. The removal of this body of waste has presented difficulties because of its size, and heavy duty equipment has been required to transport the body away from the furnace.

The present arrangement is inclusive of a method and apparatus for causing the stream of waste glass or dross to be congealed or solidified into comparatively small bodies or gobs which may be easily handled and disposed of by an operator without special equipment. One form of construction is illustrated in FIGURE 6 and is disposed beneath the entrance zone of the forehearth section 18 adjacent the drain opening 80. The arrangement is inclusive of a tubular member 82 which is preferably of square or rectangular cross section, one wall of which is provided with an opening 84. A bracket 85 is provided with ear portions 86 welded or otherwise secured to the walls of the tube 82, each of the ears 86 being provided with a slot 87 to accommodate a trunnion pin or shaft 88. The trunnion pin 88 is welded or otherwise secured to a lever or member 90 intermediate the ends thereof as shown in FIGURE 6. The pin 88 is positioned along the lever 90 so that the lever is unbalanced with the major movement being at the left of the fulcrum as viewed in FIGURE 6 whereby the lever normally assumes a substantially horizontal position indicated by the broken lines in FIGURE 6. The bracket 85 has an upwardly extending ear portion 92 which forms a limiting stop to define the horizontal position of the lever 90.

The waste glass or dross flows through the passage 80 in a small stream R which impinges upon the pad portion 91 of the lever extending into the path of the stream. The glass accumulates upon the portion 91 of the lever and solidifies to form a mass or gob 94 supported by the lever. When the accumulating mass 94 reaches a weight value sufficient to overbalance the lever or member 90 in a clockwise direction as viewed in FIGURE 6, the lever is rocked to the position shown in full lines in FIGURE 6 in which position the accumulated mass 94 is discharged or slides from the portion 91 of the member 90 as an individual body of waste glass into a waste receiving receptacle 95. The lever or member 90 immediately swings in a counterclockwise direction to the position shown in broken lines in FIGURE 6, and accumulation of waste glass or dross upon the pad portion 91 is again initiated forming, by accretion, a body or gob which is likewise discharged when it reaches a predetermined weight. The waste glass is thus discharged in the form of small pieces or bodies which may be readily collected and removed from the zone of accumulation.

FIGURE 5 is illustrative of a modified form of the connecting section of the forehearth construction. In this form the melting furnace 10 is connected to the transverse forehearth section 20' by a connecting section 100. The connecting section 100 is formed with a channel 102 through which the glass flows from the melting furnace to the transverse section 20' of the forehearth. The channel 102 is formed with a deepened zone 104, the bottom wall of which forms a continuation of the bottom wall of the furnace 10, a skimmer block 105 of platinum or other suitable high temperature resistant material providing a restricted passage 107 at the entrance of the channel. Heating means such as radiant burners 70' are disposed above the shallow zone of the channel 102 to control or regulate the temperature of the glass flowing into the central zone of the forehearth section 20', the pipes conducting a fuel and oxidant mixture to the burners being provided with valves 103 to facilitate individual regulation of each burner. Certain glass compositions fuse or melt at comparatively high temperatures, and in processing glass of this character, it is desirable to direct or concentrate a substantial quantity of heat adjacent the skimmer block 105 in the deepened zone 104 of the glass in the connecting section of the forehearth. As particularly shown in FIGURE 5, a burner 110 is disposed in a block 112 of refractory material formed in the upper or ceiling portion of the connecting section 100, the burner being arranged at approximately a 45° angle to the surface of the glass in the channel 102 and canted toward the skimmer block 105 in a direction generally opposite to the flow of the glass. In the processing of high temperature glass, the glass has a tendency to become viscous or congeal at the deepened zone 104 adjacent the skimmer block. By directing the flames from the burner 110 in an angular direction against the skimmer block, the glass in the deepened zone 104 and the passageway 107 is maintained at elevated temperature and thus tendency for the glass to solidify in said zone is avoided.

The forehearth section 100 is provided with a drain or passage 114 through which the cooler glass containing dross and other impurities adjacent the bottom wall of the deepened portion 104 in the forehearth is discharged as waste through the passage.

Illustrated in FIGURE 5 in association with the forehearth construction and shown in further detail in FIGURE 7 is a modified arrangement for accumulating the waste in individual bodies to facilitate the disposal thereof. In this form of waste disposal means, an arm or lever 116 is pivoted upon a shaft 117 journaled upon a bracket 118, secured to the tube 82'. As shown in FIGURE 7, there is secured to the lever 116 and disposed within tube 82' a rectangularly shaped member 120 having an upper surface 122 upon which the stream of glass impinges and accumulates. The interior of the member 120 is formed with a cooling chamber 124 connected with an inlet tube 125 and an outlet tube 126, both of flexible character, to accommodate swinging movement of the lever and facilitate circulation of a coolant such as water or other fluid through the chamber to conduct heat away from the surface 122 to foster the solidification and accumulation of glass upon the surface 122 in a gob or mass. The lever is provided with a counterweight 127 which is adjustable along the arm of the lever and may be locked in adjusted position through the medium of a thumb screw 128. A pipe or conduit 129 is provided through which a jet of air may be projected across the surface 122. The counterweight 127 is adjusted to overbalance the lever to maintain same normally in a substantially horizontal position with the surface 122 disposed horizontally and upon which the waste glass or dross is permitted to accumulate. By means of the arrangement shown in FIGURE 7, the waste glass and dross are accumulated upon the surface 122 when the lever is in horizontal position. When an amount of glass accumulates on the surface of sufficient weight to overbalance the lever 116, the latter tilts in a clockwise direction, as viewed in FIGURE 7, to an inclined position suitable for discharging the accumulated body of glass from the surface 122. The surface 122 is suitably cooled by water circulating through the chamber 124 to a temperature below that at which the glass wets the surface. In order to insure rapid discharge of the gob or body of glass on the surface 122, the tilting movement of lever 116 actuates a microswitch (not shown) which controls a valve contained in a housing 130 in the air conduit 129 whereby an air blast is projected against the piece or body of glass on the surface 122 to discharge the piece or body from the pad or surface 122 into a suitable waste receiving receptacle (not shown). By providing a cooled surface 122, a larger gob or piece of glass may be accumulated by reason of the rapid conduction of heat from the waste receiving surface 122 by the circulating coolant. The size of the piece of glass accumulating upon the lever may be controlled by adjusting the relative position of the counterweight 127 along the lever 116.

It is apparent that, within the scope of the invention, modifications and different arrangements may be made other than is herein disclosed, and the present disclosure is illustrative merely, the invention comprehending all variations thereof.

We claim:
1. Apparatus of the character disclosed in combination with a furnace containing a supply of heat-softenable material adapted to be heated therein to molten condition, a forehearth construction including a section extending transversely of the furnace and an intermediate section connecting the transversely extending section with the furnace, communicating channels formed in said transverse and connecting sections of the forehearth, the channel in said connecting section being in communication with the furnace forming a sole path for conveying molten material from the furnace into the transversely extending forehearth section, a plurality of radiant heating units disposed lengthwise of and above the channel in the transversely extending section and disposed lengthwise of and above the channel in the connecting section, means individual to each of the heating units for controlling said units to regulate the temperatures in various zones in the channels in said transversely extending and connecting sections, a skimmer block disposed between the furnace and the connecting section providing a restricted entrance for the material flowing from the furnace into the channel of the connecting section, a drain opening formed in a bottom wall of the channel in the connecting section through which is continuously discharged a stream of waste material, and means including a pivotally supported member disposed in the path of the stream of waste material for accumulating the waste material in relatively small, solidified bodies, said pivotally supported member being arranged to be tilted to discharge a body when the mass of the body of accumulated material overbalances the member.

2. Apparatus of the character disclosed in combination with a furnace containing a supply of heat-softenable material adapted to be heated therein to molten condition, a forehearth construction including a section extending transversely of the furnace and an intermediate section connecting the transversely extending section with the furnace, communicating channels formed in said transverse and connecting sections of the forehearth, the channel in said connecting section being in communication with the furnace for conveying molten material from the furnace into the transversely extending forehearth section, a plurality of individual feeders spaced along the transversely extending forehearth section for discharging groups of streams of molten material from the channel in said section, a plurality of radiant heating units disposed adjacent and lengthwise of the channel in the transversely extending section and adjacent and lengthwise of the channel in the connecting section, and control means individual to each of said heating units to regulate the temperatures in various zones in the channels in said transversely extending and connecting sections, one of the heating units in said connecting section being angularly disposed with respect to the surface of the heat-softenable material in the channel in the connecting section for directing heat toward the zone of the channel adjacent the furnace.

References Cited in the file of this patent

UNITED STATES PATENTS

| | | |
|---|---|---|
| 602,111 | Schluder | Apr. 12, 1898 |
| 1,538,229 | Weaver | May 19, 1925 |
| 1,541,772 | Quertinmont | June 9, 1925 |
| 1,598,307 | Pike | Aug. 31, 1926 |
| 1,796,571 | Mathieu | Mar. 17, 1931 |
| 1,927,658 | Geer | Sept. 19, 1933 |
| 2,050,211 | Honiss | Aug. 4, 1936 |
| 2,257,767 | Slayter et al. | Oct. 7, 1941 |
| 2,618,906 | Hess | Nov. 25, 1952 |

FOREIGN PATENTS

| | | |
|---|---|---|
| 190,077 | Switzerland | July 1, 1937 |